United States Patent
Heyne et al.

(10) Patent No.: US 10,974,612 B2
(45) Date of Patent: Apr. 13, 2021

(54) USE OF TWO DC/DC CONTROLLERS IN THE POWER ELECTRONICS SYSTEM OF A CHARGING STATION OR ELECTRICITY CHARGING STATION

(71) Applicants: Dr. Ing. h.c. F. Porsche Aktiengesellschaft, Stuttgart (DE); ads-tec GmbH, Nürtingen (DE)

(72) Inventors: Raoul Heyne, Wiernsheim (DE); Florian Joslowski, Leinfelden-Echterdingen (DE); Michael Kiefer, Stuttgart (DE); Thomas Speidel, Markgröningen (DE); Ali Natour, Hochdorf (DE)

(73) Assignees: Dr. Ing. h.c. F. Porsche Aktiengesellschaft; ads-tec GmbH

( * ) Notice: Subject to any disclaimer, the term of this patent is extended or adjusted under 35 U.S.C. 154(b) by 0 days.

(21) Appl. No.: 16/152,662

(22) Filed: Oct. 5, 2018

(65) Prior Publication Data
US 2019/0105999 A1 Apr. 11, 2019

(30) Foreign Application Priority Data
Oct. 6, 2017 (DE) .......................... 102017217757.8

(51) Int. Cl.
| | |
|---|---|
| *B60L 53/30* | (2019.01) |
| *H02J 7/00* | (2006.01) |
| *B60L 53/20* | (2019.01) |
| *B60L 53/14* | (2019.01) |
| *B60L 53/10* | (2019.01) |

(Continued)

(52) U.S. Cl.
CPC ............... *B60L 53/30* (2019.02); *B60L 53/11* (2019.02); *B60L 53/14* (2019.02); *B60L 53/20* (2019.02); *B60L 53/53* (2019.02); *H02J 7/0003* (2013.01); *H02J 7/0027* (2013.01); *H02J 7/0029* (2013.01); *H02J 7/342* (2020.01); *B60L 2210/10* (2013.01); *H02J 2207/40* (2020.01)

(58) Field of Classification Search
CPC ........................................................ B60L 53/30
USPC ....................................................... 320/109
See application file for complete search history.

(56) References Cited

U.S. PATENT DOCUMENTS

| | | |
|---|---|---|
| 2008/0067974 A1 | 3/2008 | Zhang et al. |
| 2011/0144842 A1* | 6/2011 | Ni .......................... B60W 10/26 701/22 |

(Continued)

FOREIGN PATENT DOCUMENTS

| | | |
|---|---|---|
| CN | 105186669 A | 12/2015 |
| DE | 102011056377 A1 | 1/2013 |

(Continued)

OTHER PUBLICATIONS

German Search Report for German Application No. 10 2017 217 757.8, dated Aug. 3, 2018, with partial translation—7 pages.

*Primary Examiner* — Eric D Lee
(74) *Attorney, Agent, or Firm* — RatnerPrestia

(57) ABSTRACT

A power electronics system of an electricity charging station having the following features: a first DC voltage converter, a first DC chopper connected to the first DC voltage converter for connection of a battery to the charging station and a second DC chopper connected to the first DC voltage converter for connection of an electric automobile to the charging station and a corresponding electricity charging station, 5 Claims, 1 Drawing Sheet

(51) Int. Cl.
*B60L 53/53* (2019.01)
*H02J 7/34* (2006.01)

(56) References Cited

U.S. PATENT DOCUMENTS

| | | | |
|---|---|---|---|
| 2012/0043923 A1* | 2/2012 | Ikriannikov | H02J 1/10 |
| | | | 320/103 |
| 2012/0074901 A1 | 3/2012 | Mohammed | |
| 2012/0181990 A1 | 7/2012 | Asakura et al. | |
| 2013/0049674 A1* | 2/2013 | Davis | B60L 53/30 |
| | | | 320/101 |
| 2014/0320084 A1* | 10/2014 | Masuda | H02J 7/35 |
| | | | 320/109 |
| 2014/0347005 A1* | 11/2014 | Zhou | H02M 3/33561 |
| | | | 320/107 |
| 2015/0061569 A1 | 3/2015 | Alexander et al. | |
| 2015/0202973 A1 | 7/2015 | Chang et al. | |
| 2015/0328999 A1 | 11/2015 | Dureau et al. | |

FOREIGN PATENT DOCUMENTS

| | | |
|---|---|---|
| DE | 102015010713 A1 | 2/2017 |
| DE | 102015214236 A1 | 2/2017 |
| EP | 2875985 A1 | 5/2015 |
| JP | 2012019602 A | 1/2012 |
| WO | 2013039753 A1 | 3/2013 |
| WO | 2014130046 A1 | 8/2014 |
| WO | 2015103164 A1 | 7/2015 |

\* cited by examiner

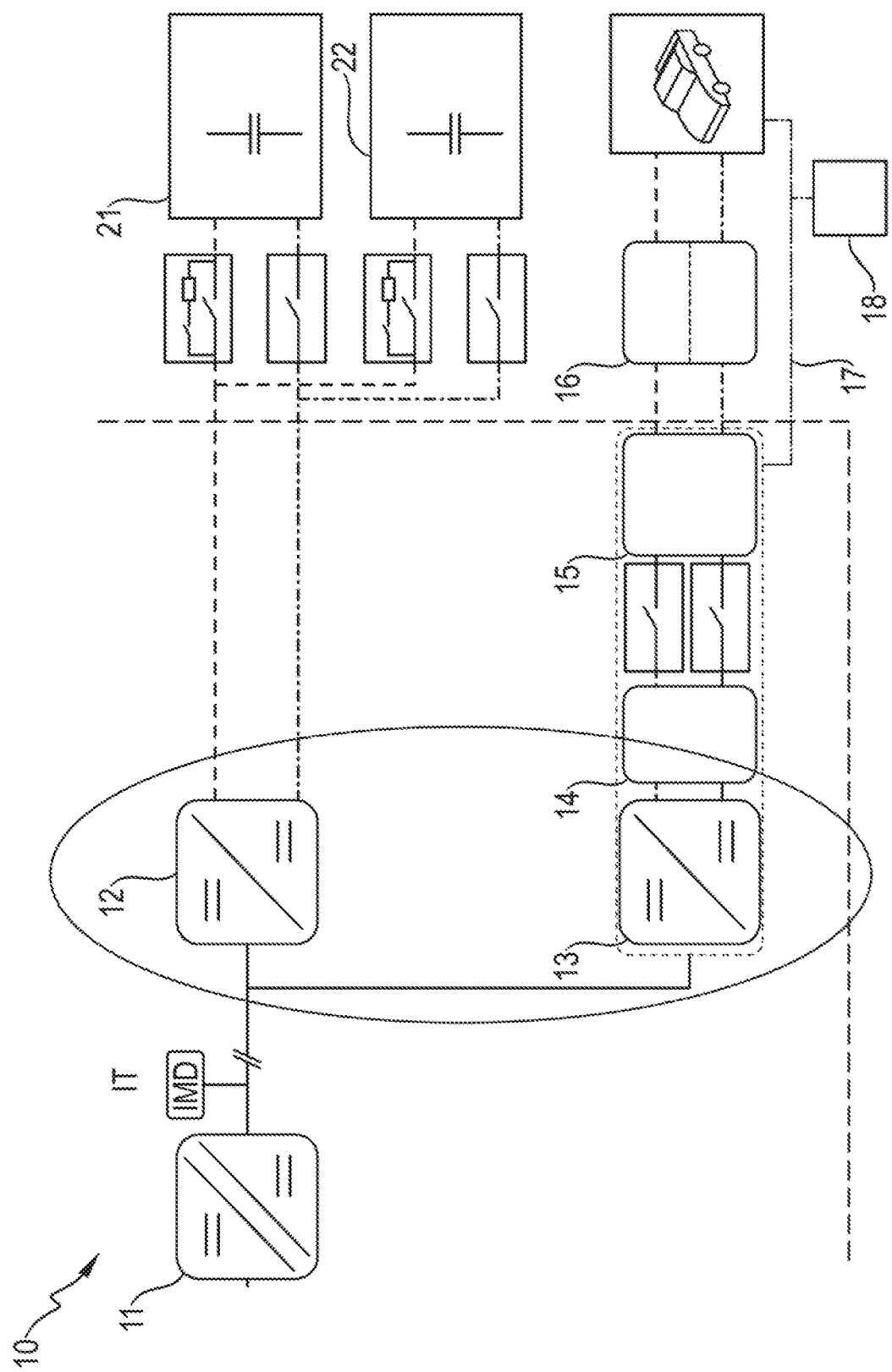

USE OF TWO DC/DC CONTROLLERS IN THE POWER ELECTRONICS SYSTEM OF A CHARGING STATION OR ELECTRICITY CHARGING STATION

CROSS-REFERENCE TO RELATED APPLICATION

This application claims priority to German Patent Application No. DE 10 2017 217 757.8, filed Oct. 6, 2017, the contents of such application being incorporated by, reference herein in their entirety.

FIELD OF THE INVENTION

The present invention relates to the use of two DC/DC controllers in the power electronics system of an electricity charging station. The present invention also relates to a corresponding charging station or electricity charging station.

BACKGROUND OF THE INVENTION

In electrical engineering, any stationary device or electrical system that serves for supplying energy to mobile, battery-operated units, machines or motor vehicles by way of simple setting or insertion without it being necessary for the energy storage—for example the traction battery of an electric automobile—to be removed compulsorily is referred to as a charging station. Charging stations for electric automobiles are also sometimes referred to as "electricity charging stations" and can comprise a plurality of charging points.

Known here in particular are direct-current fast charging/high-performance charging (HPC) systems such as the so-called combined charging system (CCS), which is widespread in Europe. In the case of direct-current charging of the generic type, direct current is fed from the charging column directly into the vehicle and, for this purpose, is provided by way of a powerful rectifier from the electricity network or by way of large buffer accumulators at solar charging stations, for example. Situated in the vehicle is battery management system, which communicates with the charging column directly indirectly in order to adapt the current intensity, or to terminate the process when a capacity limit is reached.

The power electronics system is usually located in this case in the charging column. Since the direct-current connections of the charging column are connected directly to corresponding connections of the traction battery, it is possible for high charging currents to be transmitted with little loss, which allows short charging times.

In the various charging stations used worldwide, a wide variety of topologies are used for the power electronics system. Known in particular are charging stations that additionally use an energy storage in the form of a battery. However, a plurality of topologies in the power electronics system are also possible for the connection of a battery.

For instance, US 2015202973, which is incorporated by reference herein, and WO 15103164, which is incorporated by reference herein, disclose converter constructions for a charging station for electric vehicles, which converter constructions enable additional energy storage batteries to be installed in the respective charging station. The arrangement consists in each case of a rectifier connected to the network followed by a DC voltage converter or DC chopper. The respective battery is connected on one side to the electricity network and on the other side to the charging station.

JP 2012019602, US 2015328999 and US 2012074901, all of which are incorporated by reference herein, describe further fast-charging columns for charging electric vehicles with additional energy storage batteries.

US 2015061569 and US 2008067974, both of which are incorporated by reference herein, finally discuss in each case a vehicle charging station with an additional energy storage and a network connection connected by means of a converter.

SUMMARY OF THE INVENTION

The invention provides two DC/DC controllers in a charging station for an electricity charging station and a corresponding electricity charging station according to the independent claims.

The presently used solution having two DC/DC controllers downstream of the galvanic isolation has the advantage that one DC controller is responsible only for the battery and the other is responsible for charging the vehicle. As a result, the voltage range of the battery can be used in optimum fashion. This in turn makes it possible to use the maximum battery capacity for charging, Such a topology is, at first glance, unusual because the impression may be as if it were possible to dispense with a DC/DC controller; however, said topology constitutes a very efficient solution.

The proposed approach is based on the insight that the storage battery can be incorporated into the charging column at many different connections in the topology of the power electronics system. In this case, care must be taken to ensure that the storage battery is installed efficiently. Furthermore, said storage battery should be integrated so that the storage battery is arranged in the same housing as the rest of the power electronics system in order to create a compact apparatus.

The invention also takes into account the fact that most known charging solutions provide charging columns, which draw the required charging energy directly from the network and therefore do not have an additional storage. An additional storage can be added very easily in these charging columns by virtue of said storage being connected on the AC side to the network and to the charging column. This is not necessarily the most efficient solution. Also, additional storages are often not accommodated in the same housing as the charging column, which requires more outlay in terms of installation. The charging columns furthermore often have a specific minimum size because topologies with outdated IGBT technologies are used. These are cheap but require more installation space. Additionally integrated storages are also not always integrated so that the voltage range and hence the optimum storage capacity can be used completely, In contrast, one preference of the invention disclosed here lies in the introduced possibility of installing the energy storage—in this case a battery—in the same housing as the charging column in order to minimize the installation outlay. The overall solution is also very compact in order not to obstruct the visibility in road traffic significantly. This requires the use of very fast converter topologies at high switching frequencies, which in turn requires the use of SiC MOS modules. In this case, the battery is accommodated in the DC part, which improves the efficiency of he charging station and reduces he production costs thereof.

Further advantageous configurations of the invention are specified in the dependent patent claims.

BRIEF DESCRIPTION OF THE DRAWING

One exemplary embodiment of the invention is illustrated in the drawing and is described in more detail below.

The single FIGURE shows a converter configuration according to aspects of the invention.

DETAILED DESCRIPTION OF THE INVENTION

The Figure illustrates by way of example an electricity charging station equipped with a charging station (10) according to aspects of the invention. A rectifier (AC/DC converter), which is not illustrated in the drawing, serves here in general for connection to the public TN or IT low-voltage network. A first DC voltage converter (DC/DC converter 11) connected to said rectifier transmits the voltage for protection against ground faults to the internal IT network of the charging station (10).

At this location, essentially two power paths, which are essential to the invention, split up inside the charging station (10): a first DC chopper (12) feeds the connected battery (21, 22) comprising strings (21, 22), of which there are two in accordance with the image, and allows the, energy stored in such a way to be fed back for the accelerated charging of connected vehicles. Each string may include multiple modules and each module may include multiple cells. For the supply of power to said connected vehicles, in the exemplary embodiment, a second DC chopper (13) having a DC EMC filter (14) connected downstream and a second DC voltage converter (15), preferably operated in discontinuous conduction mode (DCM), are provided, which second DC chopper and second DC voltage converter have suitably protected connection lines for the purpose of power transmission. The associated pilot line (17) can be provided with an overvoltage protection system (18) depending on the charging standard and the charging voltage,

What is claimed is:

1. A charging station for an electricity charging station, comprising:
   a rectifier for connection of the charging station to a public low-voltage network;
   a first DC voltage converter connected to the rectifier, the first DC voltage converter being a DC/DC converter,
   a first DC chopper connected to the first DC voltage converter;
   a battery connected to the first DC chopper, the battery configured to store power received via the first DC voltage converter and the first DC chopper;
   a second DC chopper connected to the first DC voltage converter for connection of an electric automobile to the charging station; and
   a housing,
   wherein the first DC voltage converter, the first DC chopper, the battery, and the second DC chopper are all accommodated in the housing,
   wherein the first DC voltage converter is connected between the rectifier and each of the first DC chopper and the second DC chopper to provide power received from the rectifier to the first DC chopper and the second DC chopper.

2. The charging station as claimed in claim 1, further comprising:
   an EMC filter connected downstream of the second DC chopper.

3. The charging station as claimed in claim 2, further comprising:
   a second DC voltage converter connected downstream of the EMC filter and configured for a discontinuous conduction mode.

4. An electricity charging station, comprising:
   a charging station as claimed in claim 3.

5. The electricity charging station as claimed in claim 4, wherein:
   the battery comprises a plurality of strings.

* * * * *